(12) United States Patent
Junker et al.

(10) Patent No.: US 9,482,091 B2
(45) Date of Patent: *Nov. 1, 2016

(54) FACE EQUIPMENT COMPRISING HOSE LEVELS PLACED BETWEEN THE FACE CONVEYOR AND THE SHIELD SUPPORT FRAMES

(75) Inventors: Martin Junker, Essen (DE); Armin Mozar, Hamm (DE)

(73) Assignee: RAG AKTIENGESELLSCHAFT, Herne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/390,268

(22) PCT Filed: Apr. 2, 2012

(86) PCT No.: PCT/EP2012/055990
§ 371 (c)(1),
(2), (4) Date: Oct. 2, 2014

(87) PCT Pub. No.: WO2013/149648
PCT Pub. Date: Oct. 10, 2013

(65) Prior Publication Data
US 2015/0061352 A1    Mar. 5, 2015

(51) Int. Cl.
*E21D 23/16* (2006.01)
*G01C 5/04* (2006.01)
*E21C 27/00* (2006.01)
*E21D 23/12* (2006.01)

(52) U.S. Cl.
CPC .............. *E21D 23/16* (2013.01); *E21C 27/00* (2013.01); *E21D 23/12* (2013.01); *G01C 5/04* (2013.01)

(58) Field of Classification Search
CPC .................................................... E21D 23/12
See application file for complete search history.

(56) References Cited

U.S. PATENT DOCUMENTS

| 4,452,078 A | 6/1984 | Formanek et al. |
| 6,425,299 B1 * | 7/2002 | Henderson ............ G01B 13/14 33/367 |

(Continued)

FOREIGN PATENT DOCUMENTS

| DE | 4333032 C2 | 11/1996 |
| DE | 102009026011 A1 | 12/2010 |
| WO | 2009/103303 A1 | 8/2009 |
| WO | 2011/144223 A1 | 11/2011 |

OTHER PUBLICATIONS

International Search Report for PCT/EP2012/055940, dated Dec. 20, 2012.

*Primary Examiner* — John Kreck
(74) *Attorney, Agent, or Firm* — Johnson, Marcou & Isaacs, LLC; Jennifer S. Stachniak

(57) ABSTRACT

A face equipment for mechanical extraction in longwall mining, in particular in the underground hard coal mining industry, includes a face conveyor (17) arranged along the mining wall, an extraction device (18) that can be moved along the face conveyor (17), and shield support frames (10) supported on the face conveyor (17) at an angle thereto. In order to determine the height of the face opening, a flexible hose level (21) with a liquid-filled hose (22) placed between the face conveyor (17) and at least one main component of the shield support frame (10) is installed in the area of the face conveyor (17). A pressure sensor (23, 24, 28) is arranged on at least one end of the hose (22). An inclination measuring device (25, 26) is arranged on the face conveyor (17) and on the main component of the shield support frame (10).

19 Claims, 3 Drawing Sheets

(56) References Cited

U.S. PATENT DOCUMENTS

| | | | | |
|---|---|---|---|---|
| 7,775,748 B2* | 8/2010 | Koenig | ................... | E21D 23/12 405/296 |
| 2012/0161493 A1* | 6/2012 | Junker | ................... | E21C 35/24 299/1.1 |
| 2015/0204191 A1* | 7/2015 | Melat | ..................... | E21C 27/32 299/1.05 |

* cited by examiner

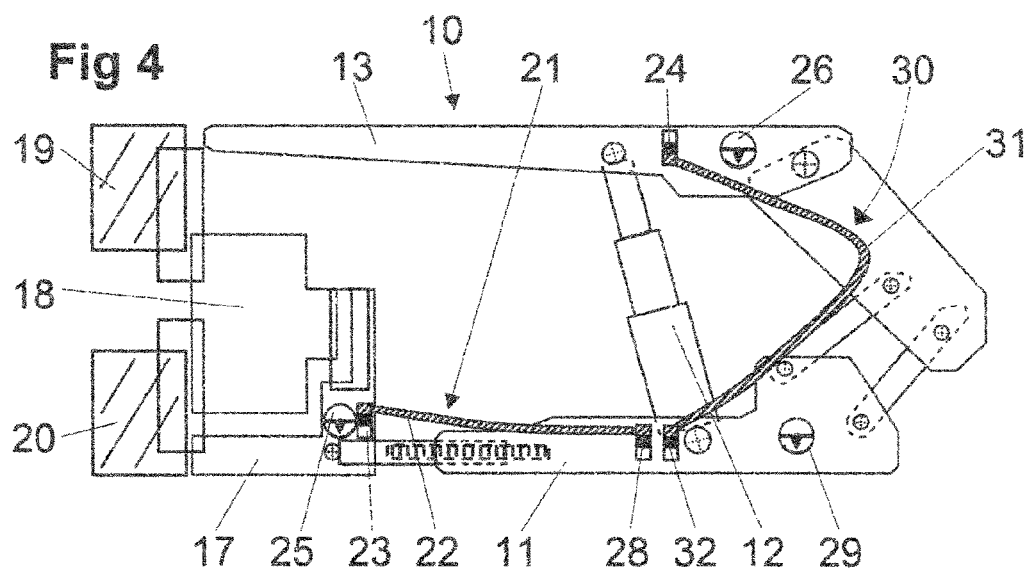
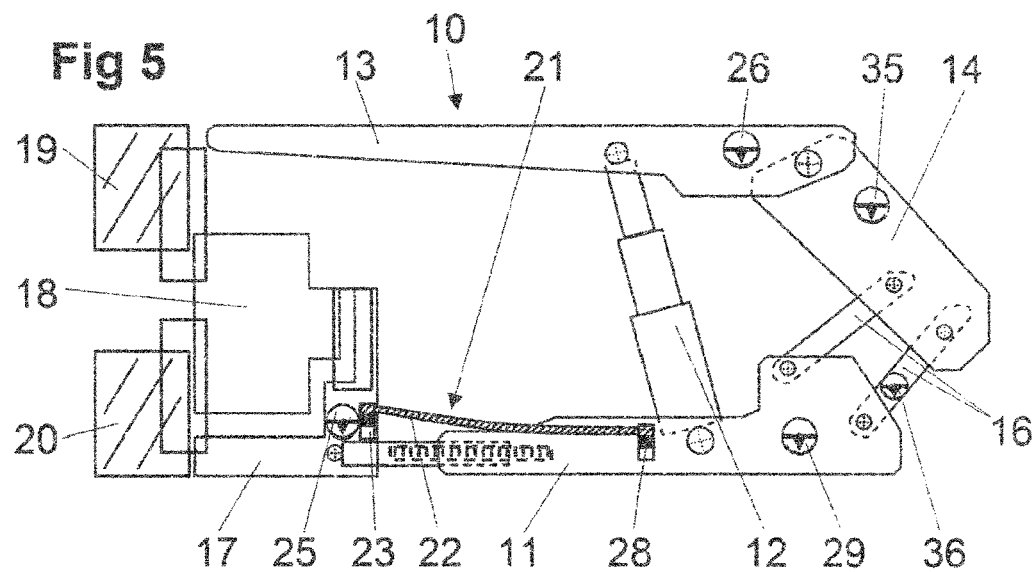

FACE EQUIPMENT COMPRISING HOSE LEVELS PLACED BETWEEN THE FACE CONVEYOR AND THE SHIELD SUPPORT FRAMES

The instant application should be granted the priority date Apr. 2, 2012, the filing date of the international patent application PCT/EP2012/055990.

BACKGROUND OF THE INVENTION

The invention relates to a face equipment for mechanical extraction in longwall mining, in particular in the underground hard coal mining industry, with a face conveyor arranged along the mining wall, an extraction means that can be moved along the face conveyor, and shield support frames supported on the face conveyor at an angle thereto.

WO 2009/103303 describes a face equipment with the aforementioned features along with a method for controlling such a face equipment. To this end, the above publication explains in detail that automating such a controller for the face equipment generally depends on knowing where the face equipment is positioned in the room, but especially on knowing the respective height of the face opening that exists in the region of the front end of the roof canopy of the shield support frame. The respective base values for calculating the face opening height are determined in this prior art by means of inclination sensors secured to the main components of the shield support frame, such as the floor skid, gob shield, support connection rod and roof canopy, which determine the inclination of the respective components against the vertical. By comparing the recorded data with base data that are stored in an evaluation unit and define the geometric orientation of the components of the shield support frame and its movement while advancing, the respective height perpendicular to the stratification can be calculated for the shield support frame at the front end of its roof canopy, which represents a gauge for the height of the face opening.

The known procedure is associated with the disadvantage of complex computing operations, which further require that the base data valid for the respective design of the used shield support frame be accurately determined, and that a useable algorithm be generated for calculating the height perpendicular to the stratification of the shield support frame.

Apart from indirectly determining the height of the face opening mentioned above, a method for directly ascertaining height data by means of a flexible hose level system while boring tunnels is known from DE 43 33 032 02. Situated between the tunnel boring machine and a reference point here is a flexible hose level system, whose closed, liquid-filled hose is allocated to the reference height at one end, and to the tunnel boring machine at the other end for determining additional measuring height dimensions for the tunnel advancing machine.

SUMMARY OF THE INVENTION

The object of the invention is to simplify face opening height determination given a generic face equipment.

The solution to this object along with advantageous embodiments and further developments of the invention may be achieved from the contents of the claims, which follow this specification.

The central idea underlying the invention provides that, in order to determine the height of the face opening, a flexible hose level with a liquid-filled hose placed between the face conveyor and at least one main component of the shield support frame is installed in the area of the face conveyor on individual shield support frames, and a pressure sensor is arranged on at least one end of the hose, wherein, in addition to considering a longitudinal and/or transverse inclination of the face conveyor and the main component of the shield support frame during face height determination, an inclination measuring device that permits the measurement of at least two tilting axes against the horizontal is arranged on the face conveyor and on the main component of the shield support frame exhibiting the end of the flexible hose level, and the pressure sensor and inclination measuring devices are connected to an analyzing and control unit.

The invention is associated with the advantage that the flexible hose level arranged on individual shield support frames or even on each shield support frame and leading to the face conveyor can be used to ascertain the height distance between the face conveyor, and hence also the extraction machine guided on the face conveyor, and a primary component of the shield support frame, and to calculate the distance between the lower edge of the face conveyor and the upper edge of the roof canopy as the height of the face opening or face height, taking into account the geometrically fixed position of the hose ends on the face conveyor and primary component of the shield support frame. Since the invention provides for arranging inclination measuring devices on the face conveyor and the respective primary component of the shield support frame, the latter furnish additional information about the transverse inclination and longitudinal inclination of both the face conveyor and the respective primary component of the shield support frame, and hence about the location of these components in the room. As a consequence, the trigonometric calculation formulas can be used to convert the result of determining the height between the face conveyor and roof canopy into the height perpendicular to the stratification for the face opening between the hanging wall and footwall.

A first embodiment of the invention provides that the hose of the flexible hose level extend between the face conveyor and the roof canopy of the shield support frame, so that the distance between the face conveyor and roof canopy can be directly ascertained.

In a first configuration, the hose of the flexible hose level can here be guided from the face conveyor directly to the roof canopy, so that the hose runs freely from its point of attachment to the face conveyor directly up until the roof canopy, wherein, with the objective of obtaining additional measured values so as to improve the basis of calculation, it can be provided that the hose running between the face conveyor and roof canopy of the shield support frame extend beyond a pressure sensor secured to the roof canopy-side end of the hose up until the floor skid of the shield support frame, and that a pressure sensor be situated on the end of the hose attached to the floor skid.

An alternatively installed flexible hose level can also provide that the hose be guided from the face conveyor via the floor skid of the shield support frame and along another component, such as a prop or gob shield, up until the roof canopy.

Since this hose configuration allows for incorporating a pressure sensor in the progression of the hose between the face conveyor and roof canopy in the area of the floor skid of the shield support frame, two height differences can be determined, specifically the difference in height between the face conveyor and the floor skid of the shield support frame on the one hand, and the difference in height between the floor skid and the roof canopy of the shield support frame on the other. From this standpoint, the bases for calculating the face height perpendicular to the stratification are improved even further.

Because a hose that extends continuously from the face conveyor over the floor skid of the shield support frame up until its roof canopy can cause problems in the course of mining operations, an embodiment of the invention provides that a respective flexible hose level with a liquid-filled hose and pressure sensors arranged at both of its ends be situated between the face conveyor and the floor skid of the shield support frame on the one hand, and between the floor skid and the roof canopy of the shield support frame on the other, wherein the floor skid-side pressure sensor of the hose running between the face conveyor and floor skid and the floor skid-side pressure sensor of the hose running between the floor skid and the roof canopy of the shield support frame form an equipotential coupling point.

In a corresponding embodiment of the invention in which a hose of the flexible hose level runs from the face conveyor directly to the roof canopy of the shield support frame and then further to its floor skid, it can also be provided that a respective flexible hose level with a liquid-filled hose and pressure sensors arranged at both of its ends be situated between the face conveyor and the roof canopy of the shield support frame on the one hand, and between the roof canopy and the floor skid of the shield support frame on the other, wherein the roof canopy-side pressure sensor of the hose running between the face conveyor and roof canopy and the roof canopy-side pressure sensor of the hose running between the roof canopy and the floor skid of the shield support frame form an equipotential coupling point.

According to an alternative embodiment of the invention, it may be sufficient for the hose of the flexible hose level to extend between the face conveyor and the floor skid of the shield support frame, so that a difference in height is ascertained between the face conveyor and floor skid. If the height of the extended shield support frame is to be included in the face height determination, the invention provides that inclination measuring devices be arranged on at least three of the four primary components of each shield support frame, such as the floor skid, gob shield, support connection rods and roof canopy, so as to determine the respective inclination of the primary components against the horizontal as the basis for calculating the height perpendicular to the stratification for the shield support frame on the front end of the roof canopy by comparing the measured data with the base data that are stored in the analyzing and control unit and define the geometric orientation of the components and their movement while advancing. Proceeding in this manner to determine the extended height of the shield support frame by way of calculation is known from WO 2009/103303 A1.

With respect to the design of the flexible hose level, a first embodiment of the invention provides that the flexible hose level is designed as a closed flexible hose level with a pressure-filled hose that is closed on both sides and connected to a pressure accumulator. The advantage to a flexible hose level closed on both sides essentially lies in the fact that a barometric correction is not needed, and that degassing-induced density changes in the liquid (for example, dissolved air) play a lesser, and hence negligible, role due to the elevated pressure level in the pressure-filled hose. For example, a disadvantage to the closed flexible hose level is that the liquid contained in the hose is completely chambered. As a result, pinching or temperature changes of the hose and liquid alike can alter the pressure level. In order to minimize this influence, a pre-stressed pressure accumulator blister with a pre-stressed gas that acts against the liquid column is connected to the hose. This also dampens hydraulic pressure fluctuations, e.g., caused by vibrations, while at the same time protecting the pressure sensors against possible pressure spikes. As a consequence, the measuring range of the pressure sensors can also be reduced to improve measuring accuracy.

As an alternative, it can be provided that the flexible hose level be designed as a flexible hose level open on one side, with a hose connected to an overflow forming the highest point of the flexible hose level, for example in the form of a correspondingly arranged overflow basin. The advantages to such a flexible hose level open on one side here lie in the fact that a simple hydrostatic pressure/height determination is present. Hose pinching or temperature-induced changes in internal pressure are prevented from influencing the measurement, and there is also only a slight sensitivity to dynamic influences in the form of mechanical oscillations. The disadvantage is that a barometric correction is required for precision measurements. In addition, problems may be encountered with respect to the arrangement of the open flexible hose level in the shield support frame, since the open end of the hose with the overflow basin must always lie at the highest location. This may require reconstruction work given the variable operating conditions that cannot be ruled out during underground mining operations. A flexible hose level overflow or refilling must also be ensured to achieve a properly operating flexible hose level.

An embodiment of the invention can provide that the pressure sensor arranged on the skid-side end of the hose be an absolute pressure sensor.

In order to improve pressure-measuring accuracy and minimize system-induced errors, an embodiment can provide that a pressure sensor be situated both on the face conveyor-side and roof canopy-side end of the hose. In such a two-sensor system, the difference between the indicated pressures can be used to infer the hydrostatic height difference. A two-sensor system is here associated with the advantage that using the difference in indicated pressures allows a barometric correction given atmospheric air pressure changes. Since the height is derived based upon the difference in pressure between both sensors, the height difference can be measured with little error based on the measured pressure difference, even given changes in the internal pressure of the hose, for example due to bent or pinched hoses.

An embodiment of the invention can here provide that the pressure sensor situated on the roof canopy-side end of the hose also be an absolute pressure sensor.

Since absolute pressure sensors are somewhat less precise in terms of their measuring results and also more expensive to procure by comparison to also known relative pressure sensors, relative pressure sensors can also serve as pressure sensors when using two pressure sensors, and each measure the atmospheric pressure against the fluid pressure.

In order to balance out a motional clearance with respect to the hose running between the face conveyor and shield support frame, specifically its roof canopy or its floor skid, as the shield support frame advances relative to the face conveyor, it can be provided that the hose or flexible hose section running between the face conveyor and shield support frame be exposed to the force of a retaining spring.

An embodiment of the invention can provide that an inclination measuring device located on the same component of the shield support frame and a pressure sensor each be arranged in a shared sensor housing with shared power supply and measuring line connector.

An embodiment of the invention provides that an inclination measuring device be situated on the floor skid of the shield support frame.

In alternative embodiments of the invention, the respectively provided inclination measuring device can consist of two uniaxial inclination sensors or a respective biaxial inclination sensor. A known triaxial inclination sensor can also be used, even if the measuring results are only required with respect to two tilting axes.

BRIEF DESCRIPTION OF THE DRAWINGS

The drawing presents embodiments of the invention, which will be described below. Shown on:

FIG. 4 is the subject matter on FIG. 3 or FIG. 1a, again in another embodiment;

FIG. 5 is an alternative embodiment of the face equipment according to FIG. 1a with a flexible hose level installed between the face conveyor and floor skid of the shield support frame, and inclination sensors arranged on the shield support frame for determining its extended height by way of calculation.

DETAILED DESCRIPTION OF SPECIFIC EMBODIMENTS

Figure 1A:
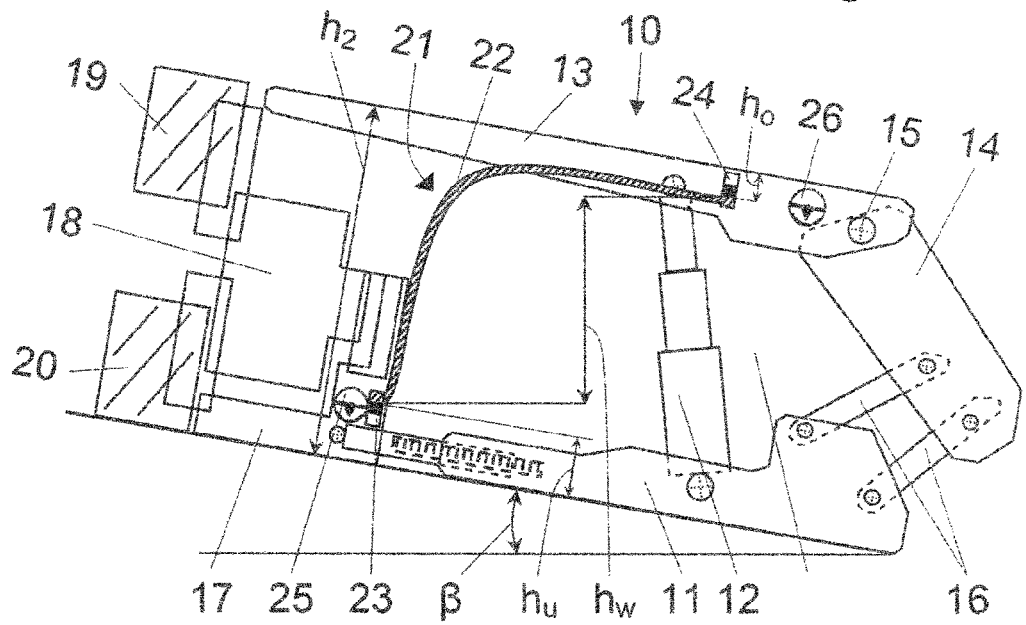
FIG. 1a is a schematic side view of a face equipment consisting of a face conveyor, an extraction machine traveling thereon, and connected shield support frames, with a flexible hose level installed between the face conveyor and roof canopy of the shield support frame.

The face equipment schematically depicted on FIG. 1a initially encompasses a shield support frame 10 with a floor skid 11, which has attached to it two parallel arranged props 12, of which only one prop can be seen on FIG. 1a, and whose upper end bears a roof canopy 13. A gob shield 14 is secured to the rear (right) end of the roof canopy 13 by means of a hinge 15, wherein the gob shield 14 is supported by two support connection rods 16 resting on the floor skid 11 in the side view. The front (left) end of the roof canopy 13 protrudes over a face conveyor 17, upon which can travel an extraction machine 18 designed as a disc shearer with a hanging wall disc 19 and footwall disc 20.

Situated between the face conveyor 17 and the roof canopy 13 of the shield support frame 10 is a flexible hose level 21 with a hose 22 running freely between the face conveyor 17 and roof canopy 13, whose lower end is arranged on the face conveyor 17, and whose upper end is arranged on the roof canopy 13. Located at both ends of the hose 22 are respective pressure sensors, specifically a lower pressure sensor 23 at the end of the hose 22 situated on the face conveyor 17, and an upper pressure sensor 24 at the end of the hose 22 situated on the roof canopy 13.

In the embodiment shown, the flexible hose level 21 is designed as a closed flexible hose level with a closed, pressurized hose 22 that is filled with a suitable liquid, and also connected to a pressure accumulator in a manner that is not depicted, yet advantageous, for example, in the form of a pressure accumulator blister. A liquid that can only absorb or dissolve a little gas is desired for use as the liquid. For simplicity's sake, the embodiment assumes that the hose 22 is filled with water, which is also available in the area of the face equipment from a longwall jet system. The two pressure sensors 23 and 24 designed either as absolute pressure sensors or also as relative pressure sensors that measure the atmospheric pressure against the fluid pressure can be used to directly determine the height of the liquid column $h_w$ independently of the installed length of the hose 22. Provided that the upper end of the hose 22 with the upper pressure sensor 24 situated thereon observes a distance $h_o$ from the upper edge of the roof canopy 13 and correspondingly the lower end of the hose 22 with the lower pressure sensor 23 situated thereon observes a distance $h_u$ from the lower edge of the floor skid 11, the resultant overall height of the shield support frame in the area of the flexible hose level 21 measures $$h_2 = h_u + h_o + h_w.$$

If the respective height perpendicular to the stratification of the face opening is to be determined as the perpendicular distance between the upper edge of the roof canopy and lower edge of the face conveyor, this height perpendicular to the stratification also corresponds to the measurable height of the liquid column with the face equipment in a horizontal position. In practice, however, the positions encountered for the face equipment in the face room deviate from the ideal horizontal position of the face equipment, so that the height perpendicular to the stratification deviates from the height of the water column of the flexible hose level 21 measurable exclusively as the vertical distance between the pressure sensors 23, 24. For this reason, this height of the water column $h_w$ must be converted into the respective height perpendicular to the stratification $h_2$, taking into account longitudinal inclinations or transverse inclinations of the shield support frame 10, including the face conveyor 17. In order to acquire the data necessary for this conversion, the roof canopy 13 as well as the face conveyor 17 in the shown embodiment each have secured to them an inclination measuring device 25 or 26, which optionally consists of two uniaxial inclination sensors, a biaxial or a triaxial inclination sensor. It is important that the respectively used inclination measuring device make it possible to measure at least two tilting axes against the horizontal.

Figure 1B:
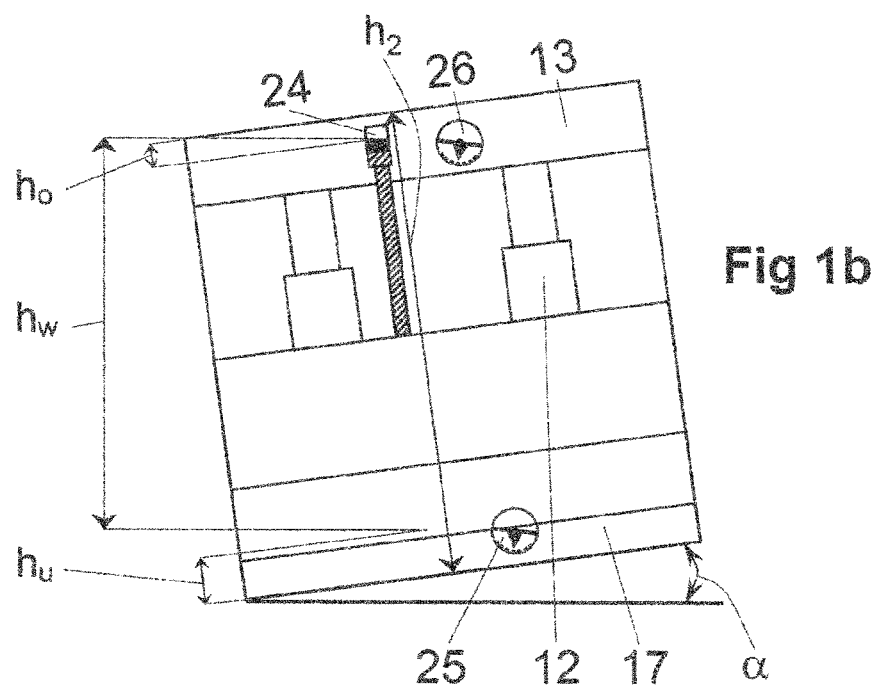
FIG. 1b is a front view of the subject matter on FIG. 1a, leaving out the extraction machine guided on the face conveyor.

The embodiment shown on FIG. 1a assumes a longitudinal inclination of the face equipment illustrated by angle β, wherein a transverse inclination of the face equipment according to angle α is simultaneously assumed based on the front view of the face equipment on FIG. 1b. For the sake of clarity, the extraction machine shown on FIG. 1a has been omitted from FIG. 1b. The face equipment positioned in the room as described above yields the height perpendicular to the stratification $h_2$ as the face height according to $$h_2 = h_u + h_o + h_w/(\cos \alpha \cdot \cos \beta).$$

Figure 2:
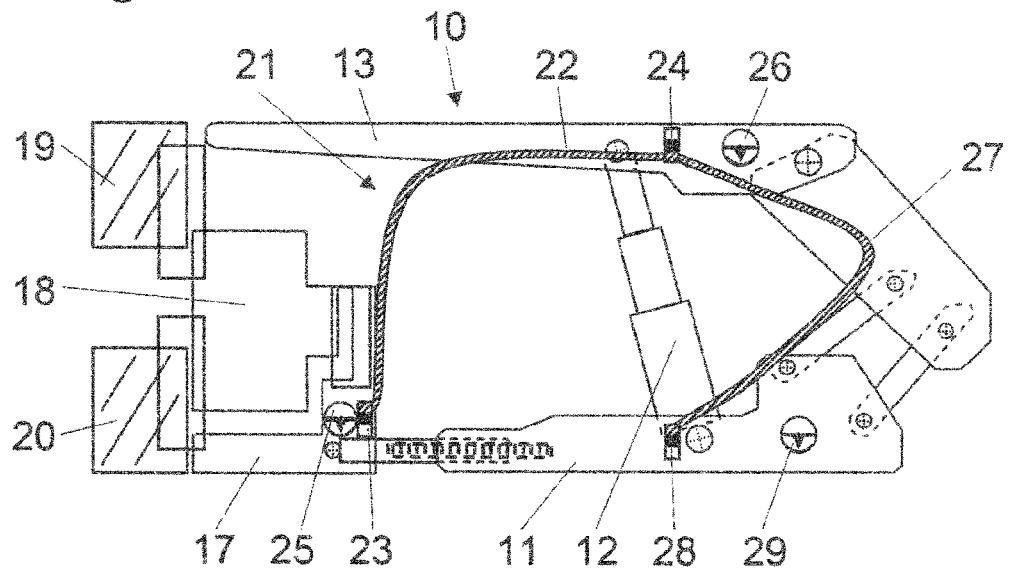
FIG. 2 is the subject matter on FIG. 1a with a flexible hose level additionally guided further from the roof canopy to the floor skid of the shield support frame.

In the embodiment shown on FIG. 2, the hose 22 of the flexible hose level 21 is guided beyond the roof canopy-side upper pressure sensor 24, with a hose branch 27 extending up until the floor skid 11 of the shield support frame 10, wherein the lower end of the hose branch 27 is secured to the floor skid 11. Accordingly, a pressure sensor 28 is also situated on the floor skid-side end of the hose branch 27. Given the positional correction to be introduced, an inclination measuring device 29 is also correspondingly attached to the floor skid 11 of the shield support frame 10. In addition to the distance between the face conveyor 17 and roof canopy 13, this embodiment also makes it possible to determine the extended height of the shield support frame 10, which may be significant when considering a potentially angled position of the face conveyor 17 relative to the floor skid 11 of the shield support frame 10, and hence to its location in the room.

Figure 3:
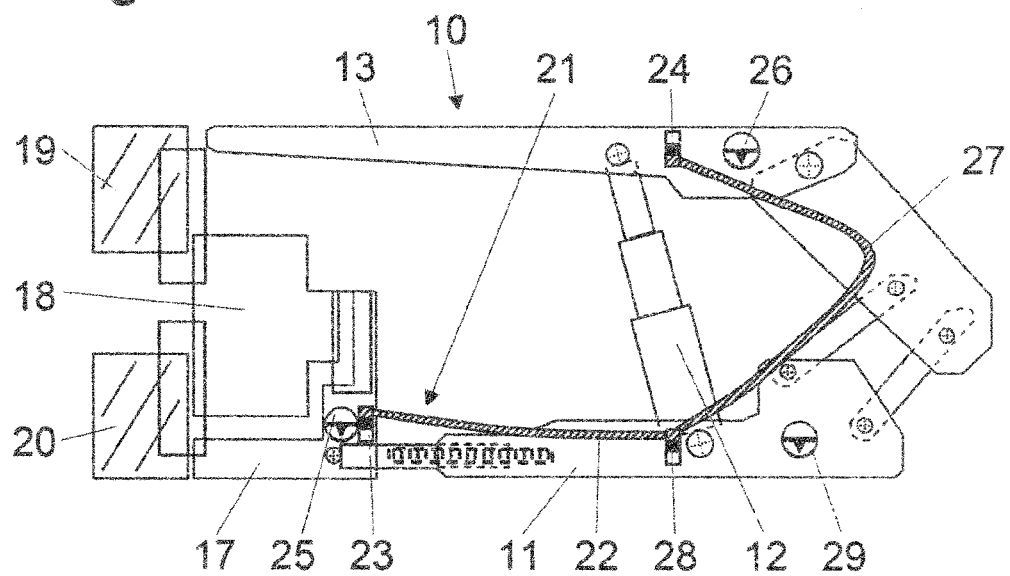
FIG. 3 is another embodiment of the face equipment according to FIG. 1a or 2 with a flexible hose level installed from the face conveyor over the floor skid of the shield support frame up until its roof canopy.

The embodiment shown on FIG. 3 only differs from the embodiment described on FIGS. 1a and 2 in that the hose 22 of the flexible hose level 21 that again runs between the face conveyor 17 and the roof canopy 13 of the shield support frame 10 has been installed in another way. The hose 22 is here guided from the face conveyor 17 over the floor skid 11 of the shield support frame 10 and the gob shield 14 up until the roof canopy 13. The conditions are otherwise identical, especially as relates to those described on FIG. 2.

In order to facilitate potential repairs to the flexible hose level 21 run between the face conveyor 17 and roof canopy 13 of the shield support frame 10, the hose progression described for FIG. 3 has been divided into two separate flexible hose levels in the embodiment shown on FIG. 4, wherein, in addition to the flexible hose level 21 installed between the face conveyor 17 and floor skid 11 as the allocated primary component of the shield support frame 10, an independent flexible hose level 30 has also been run between the floor skid 11 and the roof canopy 13 of the shield support frame 10 with a hose 31. If a pressure sensor 28 is again situated at the end of the hose 22 of the flexible hose level 21 arranged on the floor skid 11, then a second pressure sensor 32 is also situated at the lower end of the hose 31 of the second flexible hose level 30. Care must here be taken that the pressure sensors 28 and 32 respectively secured to the floor skid 11 at the ends of hose 22 and hose 31 form an equipotential coupling point. The advantage to this embodiment is that, in particular due to the special stress placed on the hose 22 running between the face conveyor 17 and floor skid 11 by the constantly recurring relative movements between the shield support frame 10 and face conveyor 17 during face equipment operation, the flexible hose level 21 with accompanying hose 22 can be easily replaced without touching the additional flexible hose level 30 installed on the shield support frame 10, so that a height measuring process does not have to be interrupted at this point.

As not shown in any greater detail, a hose progression realized according to FIG. 2 can also involve arranging a respective separate flexible hose level between the face conveyor 17 and roof canopy 13 and between the roof canopy 13 and floor skid 11, whose pressure sensors situated on the roof canopy 13 form an equipotential coupling point.

FIG. 5 presents another embodiment of the invention, in which the arrangement of a flexible hose level is confined to its installation between the face conveyor 17 and the floor skid 11 of the shield support frame 10. In this regard, the roof canopy 13 of the shield support frame 10 is not included in the direct height determination by means of the flexible hose level, with the height of the extended shield support frame 10 instead being ascertained in a manner known from WO2009/103303 A1 by securing inclination sensors 29 or 35 or 36 or 26 to at least three of the four primary components of each shield support frame 10, such as the floor skid 11, gob shield 14, support connection rods 16 or roof canopy 13, which determine the inclination of the respective shield components against the horizontal in the advancing direction. Based on the data measured here, the respective height perpendicular to the stratification for the shield support frame 10 at the front end of the roof canopy 13 is calculated in a computer unit through comparison with base data stored therein, which define the geometric orientation of the components and their movement while advancing. In this respect, the extended height of the shield support frame 10 is available as a gauge for the height of the face opening, wherein the elevation of the face conveyor 17 in relation to the position of the shield support frame 10 in the room can be determined via the height determination performed with the flexible hose level 21 and included in the face height determination.

The features described in the preceding specification or in the following claims or on the attached drawings, in their specific forms, as a means for implementing the described function, or as a method or process for achieving the described result, can be used to implement the invention in their varying forms, whether separately or in any combination of these features.

The specification incorporates by reference the disclosure PCT/EP2012/055990, filed Apr. 2, 2012.

The present invention is, of course, in no way restricted to the specific disclosure of the specification and drawings, but also encompasses any modifications within the scope of the appended claims.

The invention claimed is:

1. A face equipment for mechanical extraction in longwall mining, in particular in the underground hard coal mining industry, comprising:
   a face conveyor (17) arranged along the mining wall;
   an extraction means (18) that can be moved along the face conveyor (17);
   shield support frames (10) supported on the face conveyor (17) at an angle thereto;
   a flexible hose level (21) with a liquid-filled hose (22) placed between the face conveyor (17) and at least one main component of the shield support frame (10) installed in the area of the face conveyor (17) on individual shield support frames (10) to determine a height of the face opening;
   a pressure sensor (23, 24, 28) arranged on at least one end of the hose (22);
   an inclination measuring device (25, 26), wherein, in addition to considering a longitudinal and/or transverse inclination of the face conveyor (17) and the at least one main component of the shield support frame (10) during face height determination, the inclination measuring device (25, 26) permits measurement of at least two tilting axes against the horizontal, wherein said inclination measuring device (25, 26) is arranged on the face conveyor (17) and on the at least one main component of the shield support frame (10) exhibiting the end of the flexible hose level; and
   an analyzing and control unit, wherein the pressure sensor (23, 24, 28) and inclination measuring devices (25, 26) are connected to the analyzing and control unit.

2. The face equipment according to claim 1, wherein the hose (22) of the flexible hose level (21) extends between a face conveyor (17) and a roof canopy (13) of the shield support frame (10).

3. The face equipment according to claim 2, wherein the hose (22) of the flexible hose level (21) is guided from the face conveyor (17) directly to the roof canopy (13).

4. The face equipment according to claim 3, wherein the hose (22) running between the face conveyor (17) and roof canopy (13) of the shield support frame (10) extends beyond a pressure sensor (24) secured to a roof canopy-side end of the hose (22) up until the floor skid (11) of the shield support frame (10), and wherein a pressure sensor (28) is situated on the end of the hose (22) attached to the floor skid (11).

5. The face equipment according to claim 2, wherein the hose (22) of the flexible hose level (21) is guided from the face conveyor (17) via the floor skid (11) of the shield support frame (10) and along its other components up until the roof canopy (13).

6. The face equipment according to claim 5, wherein a pressure sensor (28) is incorporated in a progression of the hose (22) between the face conveyor (17) and roof canopy (13) in an area of a floor skid (11) of the shield support frame (10).

7. The face equipment according to claim 2, wherein a respective flexible hose level (21, 30) with a liquid-filled hose (22, 31) and pressure sensors (23, 28; 32, 24) arranged at both of its ends is situated between the face conveyor (17) and the floor skid (11) of the shield support frame (10), and between a floor skid (11) and the roof canopy (13) of the shield support frame (10), wherein a first floor skid-side pressure sensor (28) of the hose (22) running between the face conveyor (17) and floor skid (11) and a second floor skid-side pressure sensor (32) of the hose (31) running between the floor skid (11) and the roof canopy (13) of the shield support frame (10) form an equipotential coupling point.

8. The face equipment according to claim 2, wherein a respective flexible hose level with a liquid-filled hose and first and second pressure sensors arranged at both of its ends is situated between the face conveyor (17) and the roof canopy (13) of the shield support frame (10), and between the roof canopy (13) and a floor skid (11) of the shield support frame (10), wherein the first pressure sensor is a roof canopy-side pressure sensor of the hose running between the face conveyor and roof canopy and wherein the second pressure sensor is a roof canopy-side pressure sensor of the hose running between the roof canopy and the floor skid of the shield support frame form an equipotential coupling point.

9. The face equipment according to claim 1, wherein the hose (22) of the flexible hose level (21) extends between the face conveyor (17) and a floor skid (11) of the shield support frame (10), and wherein inclination measuring devices (29, 35, 36, 26) are arranged on at least three of four primary components of each shield support frame (10), wherein said primary components are selected from the group consisting of a floor skid (11), a gob shield (14), support connection rods (16) and a roof canopy (13), wherein said inclination measuring devices are positioned so as to determine the respective inclination of the primary components against the horizontal as the basis for calculating a height perpendicular to a stratification for the shield support frame (10) on a front end of the roof canopy (13) by comparing the measured data with the base data that are stored in the analyzing and control unit and to define the geometric orientation of the components and their movement while advancing.

10. The face equipment according to claim 1, wherein the flexible hose level (21, 30) is designed as a closed flexible hose level with a pressure-filled hose (22, 31) that is closed on both sides.

11. The face equipment according to claim 1, wherein the flexible hose level (21, 30) is designed as a flexible hose level open on one side.

12. The face equipment according to 11, wherein the pressure sensor (23) arranged on a skid-side end of the hose (22) is an absolute pressure sensor.

13. The face equipment according to claim 11, wherein a pressure sensor (23, 24) is situated both on a face conveyor-side and roof canopy-side end of the hose (22).

14. The face equipment according to claim 13, wherein the pressure sensor (24) situated on the roof canopy-side end of the hose (22) is an absolute pressure sensor.

15. The face equipment according to claim 1, wherein the respective pressure sensor (23, 24, 28) arranged on ends of the hose (22, 31) each are relative pressure sensors that measure the atmospheric pressure against the fluid pressure.

16. The face equipment according to claim 4, wherein an inclination measuring device (29) is situated on a floor skid (11) of the shield support frame (10).

17. The face equipment according to claim 1, wherein the inclination measuring device (25, 29, 26, 35, 36) consists of two uniaxial inclination sensors.

18. The face equipment according to claim 1, wherein the inclination measuring device (25, 29, 26, 35, 36) consists of a biaxial inclination sensor.

19. The face equipment according to claim 1, wherein the inclination measuring device (25, 29, 26, 35, 36) consists of a triaxial inclination sensor.

\* \* \* \* \*